INVENTOR

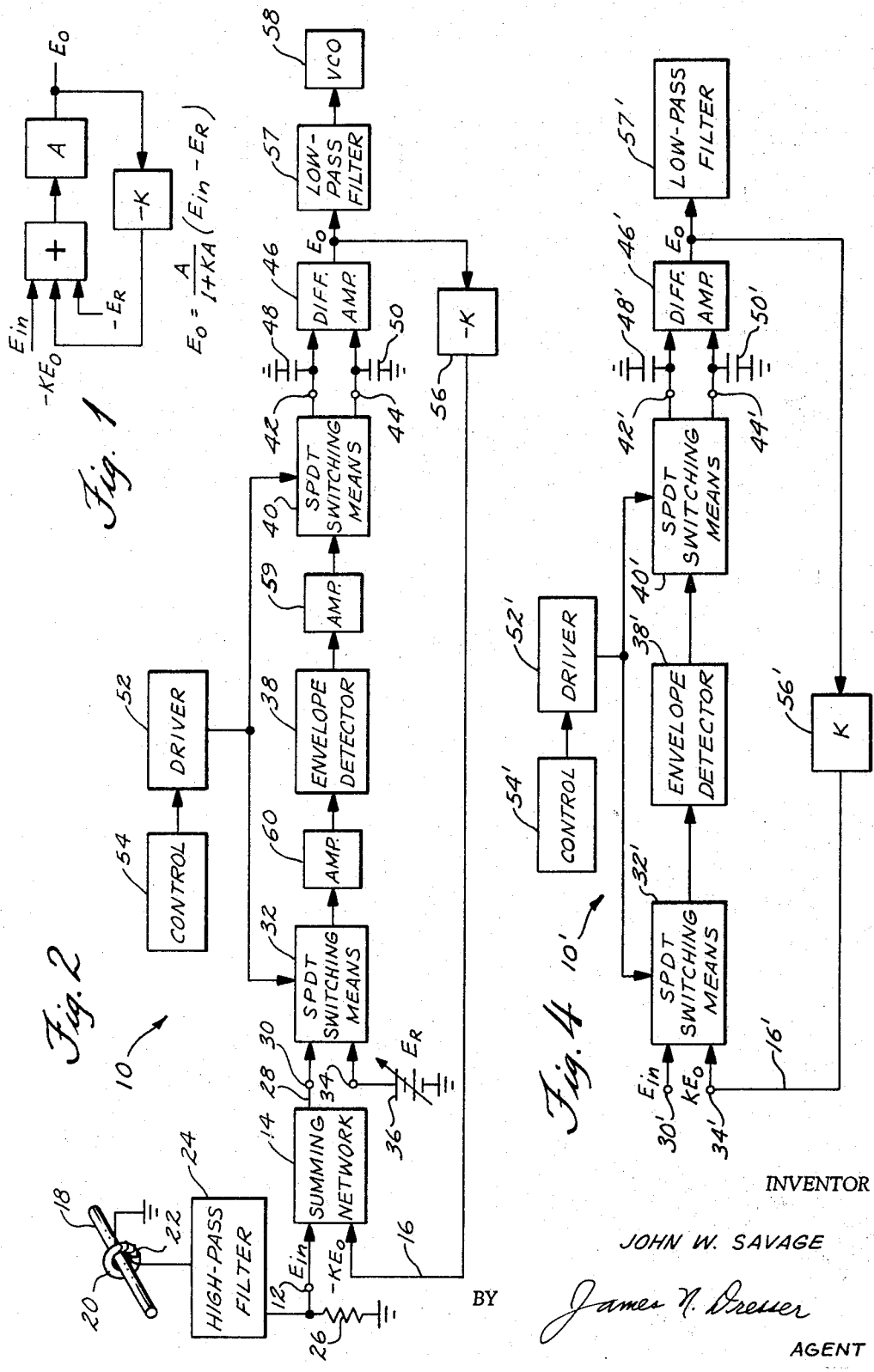

JOHN W. SAVAGE

BY James N. Dresser

AGENT

United States Patent Office 3,441,851
Patented Apr. 29, 1969

3,441,851
CHOPPER STABILIZED ELECTRICAL METER CIRCUIT WITH ENVELOPE DETECTOR AND FEEDBACK MEANS
John W. Savage, Bethesda, Md., assignor to The Susquehanna Corporation, Fairfax County, Va., a corporation of Virginia
Filed June 14, 1966, Ser. No. 557,516
Int. Cl. G01r *17/06, 19/18, 19/22*
U.S. Cl. 324—99   10 Claims

ABSTRACT OF THE DISCLOSURE

The present invention has many applications including the measurement of high frequency voltage and currents and high field intensities. The meter employs chopping techniques by switching at the input rapidly between the high frequency input signal and a reference or feedback signal. This composite signal is then envelope detected to give a square wave whose peak to peak amplitudes are proportional to the difference between the input signal level and the feedback or reference voltage. This signal is then applied to a differential amplifier by means of a second switch which operates in unison with the input switch. This second switch applies the square wave to one input of the differential amplifier during the input signal sample period and to another input of the amplifier during the reference signal or feedback period. The output of the differential amplifier is applied to a meter or recorder, and is also fed back to the input for system stabilization.

This invention relates to electrical testing equipment. More, particularly, this invention relates to an improved meter for measuring high frequency voltage or current.

Many meters are now available for measuring current and voltage, and some of these are particularly adapted for use at high frequencies. However, available high frequency meters have, in general, been found to suffer from instability or to lack high sensitivity, or both. Many existing high frequency meters also have poor temperature stability. There are meters presently available which attempt to provide temperature stability by means of an internal heat source. Such a means is obviously cumbersome and expensive and requires additional power consumption by the heat source. Many high frequency meters lack zero stability because changes in gain within the meters affect the meter operation. Other high frequency meters presently available, while more stable, are not sufficiently sensitive for use in the low millivolt or the microampere range.

The meter of the present invention is capable of measuring either voltage or current at high frequencies, into the radio frequencies. The meter has high zero stability and high temperature stability, and it has greater sensitivity than meters presently available. The invention is particularly adapted for monitoring radio frequency currents or voltages in the microampere or millivolt range. In addition to voltage and current measurements, this meter is particularly useful for determining the high frequency characteristics of semiconductors, measuring the frequency response of active and passive networks, measuring VSWR in transmission lines, performing high frequency field intensity measurements, and many other applications.

It is, accordingly, an object of the present invention to provide an improved meter capable of monitoring high frequency current or voltage.

Another object of the invention is to provide a high frequency meter having high performance stability at extreme temperature levels.

A further object is to provide an improved meter having a high sensitivity and thus capable of use in the microampere or low-millivolt range.

An additional object is to provide an improved meter in which changes in gain within the meter do not affect the meter accuracy.

A still further object of the present invention is to provide an improved meter having a high degree of zero stability.

These and other objects and advantages are achieved in the meter of the subject invention by means of a unique design in which the high frequency input signal is chopped and alternated with a reference signal prior to signal detection. Briefly, the subject meter achieves its improved performance and high stability by comprising a means for creating a composite signal made up of alternate portions of the input signal and of a reference signal, a detector to detect this composite signal and to divide the detected signal into input and reference portions, and a difference amplifier in which the input and reference portions are compared. The output signal resulting from this comparison is an indication of the input signal magnitude. Negative feedback is utilized to assure system stability, and all the active elements are within the closed loop of the system to increase temperature stability.

A further understanding of the subject invention will be obtained from the following detailed description and claims, when considered in conjunction with the accompanying drawings. In the drawings:

FIGURE 1 is a block diagram of an electronic system including a feedback path,

FIGURE 2 is a block diagram of a first embodiment of the subject invention,

Figure 3A:
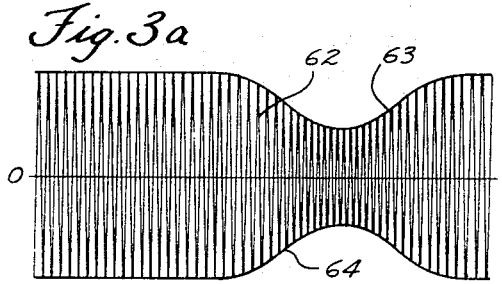

FIGURE 3 contains representations of voltage waveforms found at different points in the embodiment of the subject invention which is shown in FIGURE 2, FIGURE 4 is a block diagram of a second embodiment of the subject invention, and FIGURE 5 contains representations of voltage waveforms found at different points in the embodiment of the subject invention which is shown in FIGURE 4.

FIGURE 1 depicts the well-known circuit of an electronic system with negative feedback to assure system stability. The circuit has an open-loop transfer function A and a feedback loop with transfer function $-K$. The input signal $E_{in}$ is summed with the feedback voltage $-KE_O$, and a reference potential $E_R$ is subtracted (shown in FIGURE 1 as adding $-E_R$). Accordingly, the output voltage of this system is $$E_0 = \frac{A}{1+KA}(E_{in} - E_R)$$

This system will aid in an understanding of the present invention, as more fully explained hereinafter.

FIGURE 2 is a preferred embodiment of the subject invention in which the meter 10 is arranged to measure input voltage $E_{in}$ applied to input terminal 12. Terminal 12 is connected to summing network 14 in which this voltage is summed with a feedback voltage on line 16. If a high frequency current is being measured, then the conductor 18 in which the current flows can be passed through the opening in a current transformer, typically consisting of a torroidal core 20 having a multiturn winding 22. The voltage induced in winding 22, as the current flows through the conductor 18, causes a current to flow through highpass filter 24 and load resistor 26 to ground. The voltage drop across the resistor 26, caused by this current, is applied to terminal 12 and is proportional to the high frequency current in conductor 18.

The output of summing network 14 is a voltage equal to the sum of the input voltage $E_{in}$ applied to terminal 12 and the feedback voltage on line 16. This voltage from summing network 14 is applied by conductor 28 to the first input terminal 30 of single-pole, double-throw switching means 32. The second input 34 of switching means 32 is connected to a reference signal, such as a reference voltage $E_R$ from a variable source 36. The output of the switching means 32 is connected to the input of envelope detector 38 which has its output connected to the arm of a second single-pole, double-throw switching means 40. Switching means 40 connects envelope detector 38 alternately to first input terminal 42 and to second input terminal 44 of a difference amplifier 46. Each of the terminals 42 and 44 has associated with it a voltage storage means, shown by way of example as capacitors 48 and 50.

Switching means 40 switches between terminals 42 and 44 at the same rate that the first switching means 32 switches between terminals 30 and 34. To insure this the two switching means 32 and 40 are driven by a common driver 52 at a rate determined by control 54. This switching rate must be high in comparison with the data rate of any data carried by the input signal. Thus, if the input carrier frequency is modulated by some signal frequency, the switching rate should be at least twice the signal frequency to insure that no data carried by the signal frequency is lost.

Since switching means 32 and switching means 40 are operated in unison, when the output of summing network 14 is connected to the input of envelope detector 38, then the output of envelope detector 38 is connected to first input terminal 42 of difference amplifier 46. Similarly, when reference voltage source 36 is connected to the input of envelope detector 38, then the output of envelope detector 38 is connected to the second input terminal 44 of difference amplifier 46. Accordingly, the voltage stored on first voltage storage means 38 is proportional to the output voltage from summing network 14, while the voltage stored on voltage storage means 50 is proportional to the voltage from reference voltage source 36.

The output voltage from difference amplifier 46 is proportional to the voltage difference between the voltage stored on storage means 48 and the voltage stored on storage means 50. This output is the system output signal $E_O$, and it is passed through feedback level control circuit 56, having a transfer function $(-K)$. The output of circuit 56 is the feedback voltage $(-KE_O)$ on line 16 which is applied to summing network 14.

The voltage $E_O$ from difference amplifier 46 is passed through low pass filter 57, which removes any noise introduced by the switching frequencies. The resulting signal can be directly recorded, or it can be utilized to control some indicating means, for example, voltage controlled oscillator 58, which produces an output signal having a frequency determined by the voltage output from filter 57.

If necessary to permit measurement of low-level signals, voltage amplifiers are added at selected points in the system. For example, an amplifier 59 may be added between envelope detector 38 and switching means 40 to increase the signal levels applied to the inputs of difference amplifier 46. If extremely low-level signals are to be measured, another amplifier 60 may be added between switching means 32 and envelope detector 38. Whether these amplifiers are required will depend upon the particular use to which the meter is to be put.

Since the feedback level control circuit 56 has a transfer function $(-K)$, the voltage on line 28, the output of summing network 14, will be equal to $E_{in}-KE_O$. Consider the gain of the system between the switching means 32 and the difference amplifier 46 to be equal to A. As previously stated, when the switching means 32 is connected via terminal 30 to summing amplifier 14, the switching means 40 is connected to first input terminal 42 of difference amplifier 46, and when the switching means 32 is connected via termial 34 to the reference source 36, the switching means 40 is connected to the second input terminal 44 of difference amplifier 46. It follows that the output from difference amplifier 46 is given by the equation $E_O=A(E_{in}-KE_O)-AE_R$, and, therefore, $$E_O=\frac{A}{1+KA}(E_{in}-E_R)$$

just as in the system of FIGURE 1. It is thus seen that the output voltage is proportional to the difference between the input voltage and the reference voltage. Since the feedback is negative, as indicated by the function $-KE_O$ and by the denomination of the expression for $E_O$, system stability is assured.

By means of FIGURES 2 and 3 the operation of this first embodiment of the subject invention will be explained. FIGURE 3a depicts a waveform typical of an input voltage applied to a terminal 12. This waveform is made up of a high-frequency component signal having a positive envelope 63 and a negative envelope 64. Envelopes 63 and 64 can have constant magnitude or a varying magnitude depending upon the envelope of the signal being monitored. If the signal being monitored contains some precise data information, then the envelopes 63 and 64 will be of a varying nature and may be periodic. As previously stated, the rate at which switching means 32 and 40 are operated is at least twice the signal frequency of the data contained in envelopes 63 and 64. The frequency of the carrier component 62 must be greater than the switching frequency. As a general rule, the carrier frequency must be greater than the sum of the switching and signal frequencies to insure that sidebands comprising the switching frequency plus signal frequency do not distort the detected signal. Any carrier signal having a frequency greater than this is a high frequency signal which will be detected and measured by the system.

Figure 3B:
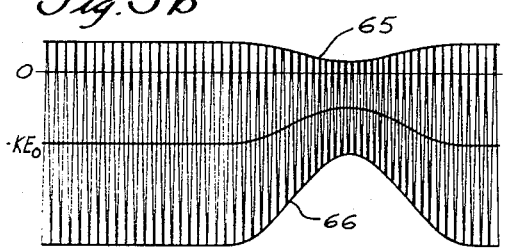

The input voltage is summed in network 14 with the feedback voltage on line 16. Relative to the frequency of the input voltage, the feedback can be considered as a DC voltage of magnitude $-KE_O$. The input voltage is a function $E_{in}=E\cos(\omega t)$; and so the output from summing network 14 is a voltage $E\cos(\omega t)-KE_O$; that is, it is a high frequency voltage as shown in FIGURE 3b, having a peak-to-peak amplitude equal to the peak-to-peak amplitude of the input voltage applied to terminal 12, but centered about a value $-KE_O$ rather than centered about 0 volt. Because of the change in center value, this voltage has a positive envelope 65 and a negative envelope 66 which are proportional to, but not identical with, envelopes 63 and 64, respectively.

Figure 3C:
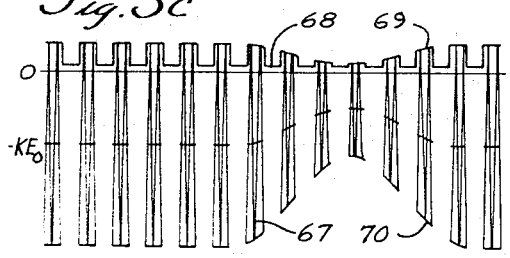

Switching means 32 connects the input of envelope detector 38 alternately to the output of summing network 14 and to variable reference voltage source 36. As a consequence, the input to envelope detector 38 is a composite signal as shown in FIGURE 3c. This signal has a first portion 67, of the high frequency signal $E_{in}-KE_O$, and a second portion 68, of DC voltage $E_R$. The positive and negative envelopes 69 and 70, respectively, of the high frequency portions 67 are proportional to the envelopes 65 and 66, respectively, of the signal depicted in FIGURE 3b, again being centered about $-KE_O$.

Figure 3D:
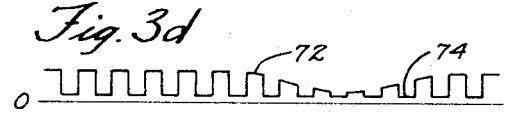

Envelope detector 38 removes the high frequency component and the negative portions from the signal applied to it, and the resulting voltage waveform, shown in FIGURE 3d, is made up of first portions 72, corresponding to envelope 69 of first portions 67 in FIGURE 3c, and second portions 74, corresponding to second portions 68 in FIGURE 3c. The magnitude of first portions 72 is dependent upon the magnitude of the envelope 69, while the magnitude of second portions 74 is dependent upon the reference voltage from source 36. The peak-to-peak amplitude of this voltage waveform from envelope detector 38 is thus proportional to the difference between (1) the output of summing network 14 $(E_{in}-KE_O)$ and (2) the reference voltage $E_R$ from source 36.

Switching means 40 applies the voltage waveform from envelope detector 38 alternately to the two input terminals of difference amplifier 46. The first portions 72 of the voltage waveform are applied to terminal 42, and the value of each portion 72 is stored on voltage storage means 48. The second portions 74 of the voltage waveform are applied to terminal 44 where the voltage magnitude is stored on voltage storage means 50.

The output from difference amplifier 46 is proportional to the difference between the voltage on storage means 48 and the voltage on storage means 50; thus, this output is proportional to the peak-to-peak magnitude of the voltage waveform of FIGURE 3d which is generated by envelope detector 38. Since the first portions 72 of the voltage waveform are proportional to the quantity ($E_{in}-KE_O$) and the second portions 74 of the voltage waveform are a constant value determined by the reference voltage $E_R$ from source 36, this output from difference amplifier 46 is given by $E_O = A(E_{in}-KE_O) - AE_R$; or $$E_O = \frac{A}{1+KA}(E_{in}-E_R)$$

Figure 3E:
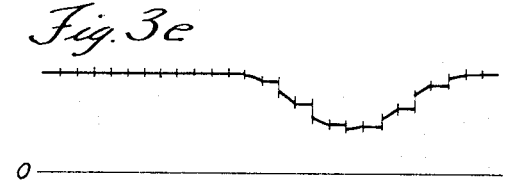
Figure 5E:
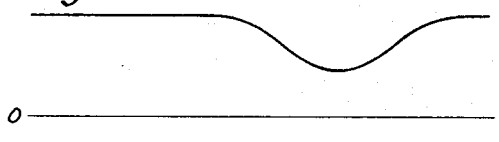
Figure 3F:
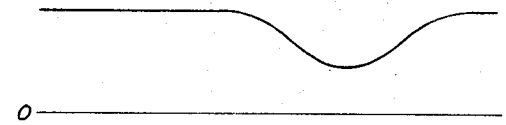

This voltage is depicted in FIGURE 3e. When this voltage is passed through low pass filter 57 to remove the transient spikes occurring when switching means 32 and 40 operate, the voltage waveform of FIGURE 3f results. It will be observed that this waveform is proportional to envelope 63 of the input signal depicted in FIGURE 3a. The voltage of waveform 3f can be indicated or recorded, for example, by passing it to a strip recorder or by using it to control a voltage controlled oscillator, the output of which is recorded.

Difference amplifier 46 by its construction is capable of producing outputs which are both positive and negative functions of its difference voltage. Thus, if the positive function $E_O$ is proportional to the voltage on storage means 48 minus the voltage on storage means 50, then the negative function ($-E_O$) is the inverse of this, being proportional to the voltage on storage means 50 minus the voltage on storage means 48. If desired, the feedback voltage can be derived from the negative function of the output voltage instead of the positive function, as shown. Then feedback level control circuit 56 will have a transfer function K, thereby eliminating an inverting operation in this circuit. Again, the feedback voltage $-KE_O$ results in negative feedback, assuring system stability. Since the feedback level control circuit 56 has a transfer function K, circuit 56 need not have any active elements.

For optimum system operation, source 36 should be adjusted so that with no input applied to terminal 12, the system output from difference amplifier 46 is zero volt. Under these conditions, changes in the open loop transfer function A within the system do not affect the zero stability of the meter. While ideally a zero volt output with zero input volts applied to terminal 12 would require that the reference voltage from variable source 36 also be zero volts, in practice it is found that some small voltage must be supplied by source 36 to compensate for detection of switching transients and to compensate for offset voltages which occur in switching means 32.

FIGURE 4 depicts a second embodiment of the subject invention which is somewhat simplified from the embodiment shown in FIGURE 2. In meter 10' of this embodiment, the feedback voltage $KE_O$ is applied to the second input terminal 34' of SPDT switching means 32', and the system input voltage $E_{in}$ is applied directly to the first terminal 30' of switching means 32'. The reference voltage, with which the input $E_{in}$ in compared, is the feedback voltage $KE_O$, rather than a fixed voltage $E_R$, as in the first embodiment. Because of this difference, the feedback voltage is the positive function $KE_O$ rather than the negative function ($-KE_O$) of the first embodiment, but, nevertheless, subsequent system operation assures stability. The signal from switching means 32' is detected in envelope detector 38' and is passed to switching means 40' which connects to the two inputs of difference amplifier 46'. Difference amplifier 46' has voltage storage means 48' and 50' associated with its inputs 42' and 44', respectively, and its output connects through feedback level control circuit 56' to input 34' of switching means 32'. The output from difference amplifier 46' is also connected through low pass filter 57' from which it can be connected to a utilizing device (not shown). Switching means 32' and 40' are driven in unison by driver 52' at a rate determined by control 54'.

Figure 5A:
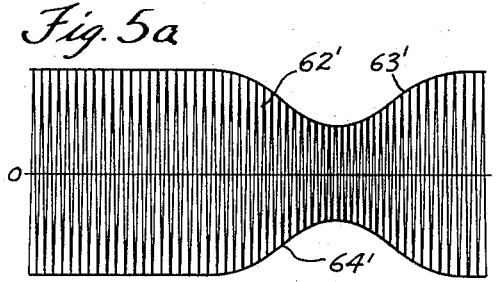
Figure 5B:
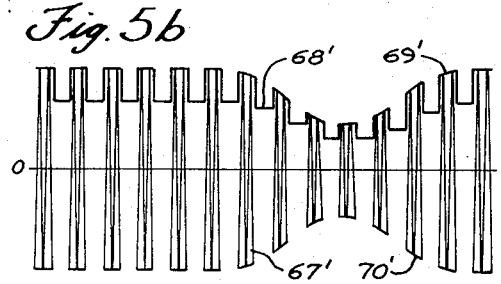

FIGURE 5a depicts the waveform of the input voltage supplied to terminal 30'. This waveform is identical to that of FIGURE 3a used in describing the operation of the first embodiment above. Again, the waveform has a high frequency component 62', with a positive envelope 63' and a negative envelope 64' which follow the envelope of the signal being monitored. Switching means 32' alternately connects its two inputs 30' and 34' to the input of envelope detector 38'. Consequently, the voltage applied to detector 38' is a composite signal as shown in FIGURE 5b. This composite signal has a first portion 67', of the high frequency input signal, and a second portion 68', of the feedback signal $KE_O$. The positive and negative envelopes 69' and 70', respectively, of the high frequency portions 67' are proportional respectively to envelopes 63' and 64' of the input signal shown in FIGURE 5a.

The envelopes 69' and 70' will vary in level as the input envelopes 63' and 64' vary in accordance with changes in the level of the signal being monitored. Variation in level also occurs in second portions 68' as the level of the feedback signal $KE_O$ varies. However, each distinct second portion 68' maintains a constant level over its interval; changes in level affect the feedback signal only between one portion 68' and the next. Consequently, the envelope peak-to-peak voltage between a particular RF envelope portion 69' and the adjacent feedback portion 68' will vary in accordance with the variation in the envelope 63' of this input signal.

Figure 5C:
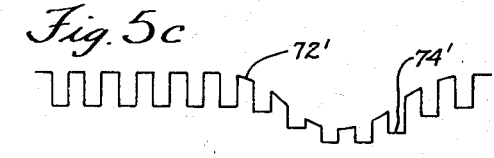

Envelope detector 38' removes the high frequency component and the negative portions from the signal 5b, and its output is a voltage waveform as shown in FIGURE 5c having first portions 72' corresponding to the envelope 69' of the first portions 67' in FIGURE 5b, and having second portions 74' corresponding to second portions 68' in FIGURE 5b. The peak-to-peak amplitude of this voltage waveform is proportional to the difference between the input voltage $E_{in}$ and the feedback voltage $KE_O$. This voltage waveform is applied by switching means 40' to the two input terminals of difference amplifier 46'. The first portions 72' of the voltage waveform are applied to terminal 42', and the value of each portion 72' is stored on voltage storage means 48'. The second portions 74' of the waveform are applied to terminal 44' where the voltage magnitude is stored on storage means 50'.

The output from difference amplifier 46' is proportional to the difference between the voltage on storage means 48' and the voltage on storage means 50'. Thus, this output is proportional to the difference between the input voltage $E_{in}$ and the feedback voltage $KE_O$. Accordingly, this output from difference amplifier 46' is given by the equation $E_O = A(E_{in}-KE_O)$, or $$E_O = \frac{A}{1+KA}E_{in}$$

Figure 5D:
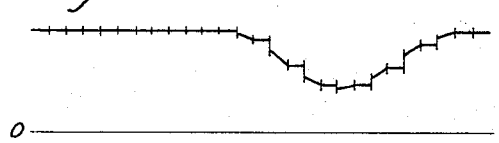

Since the feedback signal $KE_O$ is combined with the input signal in difference amplifier 46', the effect of negative feedback is achieved, as indicated by the form of the equation for the output voltage $E_O$. This voltage is depicted in FIGURE 5d. When it is passed through low-pass filter 57' to remove the transient spikes caused by the operation of switching means 32' and 40', the voltage waveform of FIGURE 5e results. This waveform is proportional to the envelope 63' of the input signal shown in FIGURE 5a. Comparison of FIGURES 3f and 5e reveals that the output from this second embodiment is similar to the corresponding output from the first embodiment. Again, the output from low-pass filter 57' can be recorded, or it can be utilized to control some indication means, such as a voltage controlled oscillator, to give a record of the input voltage magnitude.

Each of the components making up the meter 10 is of a standard design, as shown by the following examples. The switching means 32 and 40 can each be a solid-state relay or a balanced transistor chopper as shown in FIGURES 17–28 on page 654 of the book Pulse, Digital and Switching Waveforms by Jacob Millman and Herbert Taub, McGraw-Hill Book Company, 1965. Summing network 14 can be a conventional resistor network, or it can be a summing amplifier as depicted on pages 147 and 148 of the book Transistor Circuit Engineering, edited by Richard F. Shea, published by John Wiley & Sons, Inc., New York, second printing, September 1957. Envelope detector 38 can be a common-emitter detector as shown on pages 289 and 290 of the above-cited Transistor Circuit Engineering. Difference amplifier 46 can be of the design shown on pages 151 and 152 of Shea's book. Switch driver 52 can be a conventional free-running multivibrator, with control 54 selecting its operating frequency. The feedback level control circuit 56 can be a voltage attenuator with an emitter follower to provide isolation and a unity gain amplifier to provide phase reversal, as necessary. Voltage amplifiers 59 and 60 can be standard transistor amplifiers, having one or more stages as required. These specific components are cited by way of example, and, of course, equivalent components might be substituted for one or more of them.

In addition to measuring a high frequency current, as depicted in FIGURE 2, the meter of the subject invention can be used to measure a high frequency voltage. In such a case, the voltage would be applied directly to terminal 12. In addition, it has been found that the subject invention is well suited for use as a high field intensity meter. By passing a single-turn closed loop of wire (not shown) through toroid 20, a wideband H-field antenna is formed. The loop acts as a transformer primary, and the multiturn winding 22 constitutes the secondary. The voltage applied to terminal 12 from such a pick-up as a result of surrounding magnetic fields has been found to have a substantially flat frequency response, so long as the loop circumference is short in comparison with a quarter wavelength. The particular input device utilized will depend upon the parameter to be measured, and the input device per se forms no part of the subject invention. All that is required is that the input voltage $E_{in}$ be proportional to the signal property being measured.

Although this invention has been described with reference to illustrative embodiments thereof, it will be apparent to those skilled in the art that the principles of this invention can be embodied in other forms but within the scope of the claims.

What is claimed is:

1. Apparatus for measuring a property of an electrical signal comprising in combination:
    (a) input means including means for providing a high frequency input signal, having an envelope proportional to that property of the electrical signal which is being measured, and a reference signal;
    (b) means for receiving said input signal and said reference signal and generating a voltage waveform having alternate first and second portions, said first portions being proportional to the envelope of said high frequency signal, said second portions being proportional to said reference signal;
    (c) means for generating an output voltage proportional to the magnitude difference between adjacent ones of said first portions and said second portions, said output voltage varying in accordance with variation in magnitude of said first portions and of said second portions;
    (d) means for generating a feedback voltage proportional to said output voltage; and
    (e) means for applying said feedback voltage to said input means.

2. The apparatus as claimed in claim 1 wherein said reference signal input is supplied with a DC voltage.

3. Apparatus as claimed in claim 1 wherein said feedback voltage applying means is connected to said reference signal input.

4. Apparatus as claimed in claim 1 wherein said input signal is summed with said feedback voltage.

5. A system for measuring high frequency electrical signals comprising:
    (a) an envelope detector having an input and an output,
    (b) a difference amplifier having first and second input terminals and an output terminal, each of said input terminals having voltage storage means,
    (c) a reference signal source,
    (d) a voltage input terminal,
    (e) first and second switching means, said first switching means connecting said envelope detector input alternately to said voltage input terminal and to said reference signal source, said second switching means connecting said envelope detector output alternately to said first and said second input terminals of said difference amplifier,
    (f) means for driving both of said switching means in unison to cause said envelope detector input to be connected to said voltage input terminal when said envelope detector output is connected to said first input of said difference amplifier, and to cause said envelope detector input to be connected to said reference signal source when said envelope detector output is connected to said second input of said difference amplifier,
    (g) a feedback circuit connected to said difference amplifier output, and
    (h) means for connecting said feedback circuit to said first switching means.

6. The system of claim 5 in which said reference signal source is said feedback circuit.

7. The system of claim 5 further comprising voltage summing means having first and second input terminals and an output terminal, said summing means output terminal being connected to said voltage input terminal, said summing means first input terminal being adapted to receive said high frequency electrical signals, said summing network second input terminal being connected to said feedback loop, and said reference signal source being a source of DC voltage.

8. The system of claim 7 further comprising:
    (a) means for controlling the rate of operation of said driving means,
    (b) voltage level control means in said feedback circuit,
    (c) first means for amplifying the input to said envelope detector, and
    (d) second means for amplifying the output of said envelope detector.

9. A system for measuring an electrical input signal and for generating a system output signal having a magnitude proportional to the magnitude of said electrical input signal, said system comprising:
    (a) means for providing a high frequency signal proportional to said electrical input signal,
    (b) summing means having first and second input terminals and an output terminal,
    (c) first switching means having first and second inputs and an output,
    (d) an envelope detector having an input and an output, (e) second switching means having an input and first and second outputs,
(f) a difference amplifier having first and second input terminals and an output, each of said input terminals having voltage storage means,
(g) switch driving means,
(h) a source of reference voltage,
(i) said first input of said summing means connected to said high frequency voltage providing means, said second input of said summing means connected to said difference amplifier output, said first input of said first switching means connected to said summing means output, said second input of said first switching means connected to said source of reference voltage, said first switching means output connected to said envelope detector input, said envelope detector output connected to said input of said second switching means, said first output of said second switching means connected to said first input of said difference amplifier, said second output of said second switching means connected to said second input of said difference amplifier, said switch driving means driving said first and second switching means in unison to cause said envelope detector input to be connected to said summing means output when said envelope detector output is connected to said first input of said difference amplifier, and to cause said envelope detector input to be connected to said reference voltage source when said envelope detector output is connected to said second input of said difference amplifier.

10. The system as claimed in claim 9 further comprising a voltage indication means and a low-pass filter having an input and an output, said filter input connected to said difference amplifier output and said filter output connected to said voltage indication means.

References Cited
UNITED STATES PATENTS

| | | | |
|---|---|---|---|
| 2,459,730 | 1/1949 | Williams | 324—118 |
| 2,872,641 | 2/1959 | Hudson et al. | 324—99 XR |
| 3,041,535 | 6/1962 | Cochran | 324—118 |
| 3,079,565 | 2/1963 | Offner | 324—118 XR |
| 3,154,749 | 10/1964 | Perkins | 329—50 XR |
| 3,213,364 | 10/1965 | Miller et al. | 324—99 XR |
| 3,265,976 | 8/1966 | Broadhead | 329—50 XR |
| 3,265,980 | 8/1966 | Thompson | 330—10 |
| 3,273,059 | 9/1966 | Andresen et al. | 324—99 |
| 3,354,401 | 11/1967 | Lode | 330—10 |

RUDOLPH V. ROLINEC, *Primary Examiner.*

G. R. STRECKER, *Assistant Examiner.*

U.S. Cl. X.R.

324—118, 140; 329—50